(12) United States Patent
Xu

(10) Patent No.: US 8,971,905 B2
(45) Date of Patent: Mar. 3, 2015

(54) METHOD, DEVICE, AND SYSTEM FOR PERFORMING ASSIGNMENT FOR A CALL

(71) Applicant: Huawei Technologies Co., Ltd., Shenzhen (CN)

(72) Inventor: Binbin Xu, Xi'an (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 102 days.

(21) Appl. No.: 13/727,975

(22) Filed: Dec. 27, 2012

(65) Prior Publication Data
US 2013/0115965 A1 May 9, 2013

Related U.S. Application Data

(63) Continuation of application No. PCT/CN2011/075186, filed on Jun. 2, 2011.

(30) Foreign Application Priority Data

Jun. 30, 2010 (CN) .......................... 2010 1 0218682

(51) Int. Cl.
*H04W 72/00* (2009.01)
*H04W 72/04* (2009.01)
(Continued)

(52) U.S. Cl.
CPC .......... *H04W 72/04* (2013.01); *H04W 72/0453* (2013.01); *H04W 28/20* (2013.01); *H04W 36/0072* (2013.01); *H04W 48/20* (2013.01)
USPC ..... 455/450; 455/453; 455/452.1; 455/435.3; 370/235; 370/328

(58) Field of Classification Search
USPC .......... 370/331, 235, 328; 455/450, 519, 520, 455/453, 452.1, 435.3
See application file for complete search history.

(56) References Cited

U.S. PATENT DOCUMENTS

| 8,447,318 | B1 * | 5/2013 | Oroskar | ......................... 455/453 |
| 2003/0133415 | A1 * | 7/2003 | Kim et al. | ...................... 370/235 |

(Continued)

FOREIGN PATENT DOCUMENTS

| CN | 1313686 A | 9/2001 |
| CN | 1374773 A | 10/2002 |

(Continued)

OTHER PUBLICATIONS

First Chinese Office Action of Chinese Application No. 201010218682.5 mailed Mar. 22, 2012, 8 pages, (Partial Translation).

(Continued)

*Primary Examiner* — David Q Nguyen
(74) *Attorney, Agent, or Firm* — Slater & Matsil, L.L.P.

(57) ABSTRACT

The invention discloses a method for performing assignment for a call. The method includes: if a user initiates a call, assigning a target bearer for the call and obtaining an identifier of the target bearer; determining at least one target base station according to the identifier of the target bearer and an identifier of a base station accessed by the user, wherein the coverage of the target bearer of the at least one target base station overlaps with the coverage of a bearer, on which the call is initiated, of the base station accessed by the user, and obtaining identifier of the at least one target base station; and sending the identifier of the target bearer and the identifier of the at least one target base station to the user. The invention is capable of improving the success rate of the assignment.

12 Claims, 8 Drawing Sheets

(51) Int. Cl.
    *H04W 28/20* (2009.01)
    *H04W 36/00* (2009.01)
    *H04W 48/20* (2009.01)

(56) References Cited

U.S. PATENT DOCUMENTS

| | | | |
|---|---|---|---|
| 2004/0199668 | A1 | 10/2004 | Lin et al. |
| 2005/0013273 | A1* | 1/2005 | Zhang ............................ 370/328 |
| 2005/0233753 | A1* | 10/2005 | Hamabe et al. ............ 455/452.1 |
| 2006/0052103 | A1* | 3/2006 | Mikoshiba et al. ........ 455/435.3 |
| 2006/0142021 | A1 | 6/2006 | Mueckenheim et al. |
| 2007/0021060 | A1* | 1/2007 | Karabinis et al. ............ 455/12.1 |
| 2007/0178906 | A1 | 8/2007 | Gao et al. |
| 2010/0272067 | A1* | 10/2010 | Lu et al. ........................ 370/331 |

FOREIGN PATENT DOCUMENTS

| | | |
|---|---|---|
| CN | 1377151 A | 10/2002 |
| CN | 1469570 A | 1/2004 |
| CN | 1564495 A | 1/2005 |
| CN | 1571292 A | 1/2005 |
| CN | 1592165 A | 3/2005 |
| CN | 1738479 A | 2/2006 |
| CN | 2006-191582 A | 7/2006 |
| CN | 101119140 A | 2/2008 |
| CN | 101137184 A | 3/2008 |
| CN | 101163335 A | 4/2008 |
| CN | 101175322 A | 5/2008 |
| CN | 101198142 A | 6/2008 |
| CN | 101212402 A | 7/2008 |
| CN | 101296475 A | 10/2008 |
| CN | 101521910 A | 9/2009 |
| CN | 101873709 A | 10/2010 |
| CN | 101873709 B | 6/2013 |
| EP | 0981256 A2 | 2/2000 |
| EP | 1 134 994 A1 | 9/2001 |
| WO | WO 2007/068198 A1 | 6/2007 |

OTHER PUBLICATIONS

Second Chinese Office Action of Chinese Application No. 201010218682.5 mailed Sep. 19, 2012, 7 pages, (Partial Translation).

International Search Report received in International Application No. PCT/CN2011/075186, Applicant: Huawei Technologies Co., Ltd. et al., mailed Sep. 15, 2011, 4 pages.

Written Opinion of the International Searching Authority received in International Application No. PCT/CN2011/075186, Applicant: Huawei Technologies Co., Ltd. et al., mailed Sep. 15, 2011, 5 pages.

* cited by examiner

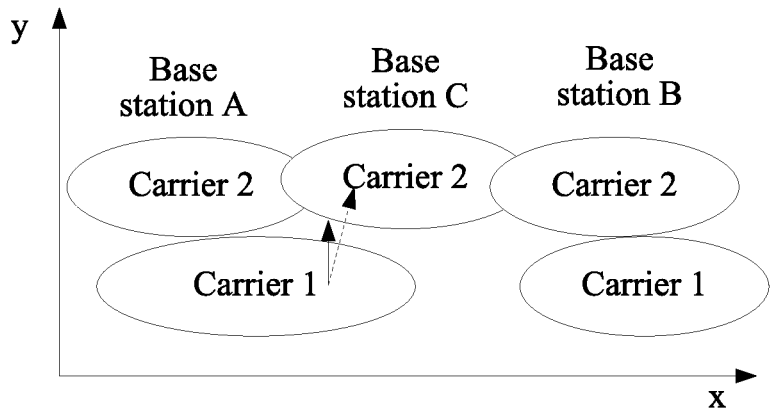

FIG. 6

```
┌─────────────────────────────────────────────┐
│ When a user initiates a call, a system side assigns a │─101
│ target bearer for the call from bearers in the        │
│ multibearer network with overlapping coverage and     │
│      obtains an identifier of the target bearer       │
└─────────────────────────────────────────────┘
                       │
                       ▼
┌─────────────────────────────────────────────┐
│ The system side determines one or multiple target base│─102
│ stations, according to the identifier of the target bearer│
│ and an identifier of a base station through which the │
│ user initiates the call, and obtains an identifier of the │
│                 target base station                    │
└─────────────────────────────────────────────┘
                       │
                       ▼
┌─────────────────────────────────────────────┐
│  Send the obtained Identifier of the target bearer and │─103
│ the obtained identifier of the target base station to the │
│                        user                            │
└─────────────────────────────────────────────┘
```

FIG. 7

METHOD, DEVICE, AND SYSTEM FOR PERFORMING ASSIGNMENT FOR A CALL

This application is a continuation of International Application No. PCT/CN2011/075186, filed on Jun. 2, 2011, which claims priority to Chinese Patent Application No. 201010218682.5, filed on Jun. 30, 2010, both of which are hereby incorporated by reference in their entireties.

TECHNICAL FIELD

The present invention relates to the field of wireless communications, and in particular, to a method, a device, and a system for performing assignment for a call.

BACKGROUND

In a wireless mobile cellular network, for a scenario of a multiband or multicarrier network with overlapping coverage, to achieve the optimization of resource utilization and network performance, it is usually required to assign an optimal frequency band or carrier to a call initiated by a user and notify the user of performing process related to the call on the assigned frequency band or carrier.

Currently, methods for assigning frequency bands or carriers to a call are used in the scenario of a multiband or multicarrier co-sited network with overlapping coverage. Specifically, if a user initiates a call on a frequency band or carrier of a base station, system side selects a frequency band or carrier with a light load among frequency bands or carriers of the base station, or selects a frequency band or carrier among the frequency bands or carriers of the base station according to service type of the call, then assigns the selected frequency band or carrier to the call, and sends information of the assigned frequency band or carrier to the user. The user may perform process relevant to the call on the assigned frequency band of the base station.

In the implementation of the present invention, the inventor finds at least the following problems in the prior art.

For a scenario of a non co-sited network with overlapping coverage, each base station in the network has only one frequency band or carrier, and therefore, the frequency band or carrier cannot be assigned to a call according to the prior art.

For a scenario of a co-sited network with overlapping coverage, if the coverage of the frequency bands or carriers of the base station are inconsistent, assume that a user initiates a call on an edge of a frequency band or carrier with large coverage of the base station, and if a frequency band or carrier with small coverage is assigned to the call and the position of the user falls beyond the coverage of the assigned frequency band or carrier with small coverage, the user cannot successfully perform process relevant to the call on the assigned frequency band or carrier of the base station because the assigned frequency band or carrier of the base station does not have sufficient coverage, thereby success rate of the assignment is decreased.

SUMMARY OF THE INVENTION

To improve success rate of the assignment in a scenario of a non co-sited network with overlapping coverage, the present invention provides a method, a device, and a system for performing assignment for a call. The technical solutions are as follows.

A method for performing assignment for a call is provided, where the method includes if a user initiates a call, assigning, by system side, a target bearer for the call from bearers in a multibearer network with overlapping coverage, according to load of each of the bearers or service type of the call, and obtaining an identifier of the target bearer, where the bearers include frequency bands or carriers, determining, by the system side, at least one target base station according to the identifier of the target bearer and an identifier of a base station accessed by the user to initiate the call, where the coverage of the target bearer of the at least one target base station overlaps with the coverage of a bearer, on which the call is initiated, of the base station accessed by the user, and obtaining identifier(s) of the at least one target base station, and sending, by the system side, the identifier of the target bearer and the identifier(s) of the at least one target base station to the user.

A device for performing assignment for a call is provided, where the device includes an assignment module, configured to, if a user initiates a call, assign a target bearer for the call from bearers in the multibearer network with overlapping coverage, according to load of each of the bearers or service type of the call, and obtain an identifier of the target bearer, where the bearer includes frequency band or carrier, an obtaining module, configured to determine at least one target base station according to the identifier of the target bearer and an identifier of a base station accessed by the user to initiate the call, where coverage of the target bearer of the at least one target base station overlaps with the coverage of a bearer, on which the call is initiated, of the base station accessed by the user, and obtain identifier(s) of the at least one target base station, and a sending module, configured to send the identifier of the target bearer and the identifier(s) of the at least one target base station to the user.

A system for performing assignment for a call is provided, where the system includes a device for performing assignment for a call and a user the device for performing assignment for a call is configured to, when the user initiates a call, assign a target bearer for the call from bearers in the multibearer network with overlapping coverage, according to a load of each of the bearers or a service type of the call, and obtain an identifier of the target bearer, where the bearers include frequency bands or carriers; determine at least one target base station according to the identifier of the target bearer and an identifier of a base station through which the user initiates the call, where the coverage of the target bearer of the at least one target base station overlaps with the coverage of a bearer, on which the call is initiated, of the base station accessed by the user, and obtain identifier(s) of the at least one target base station; and send the identifier of the target bearer and the identifier(s) of the at least one target base station to the user.

The target bearer is assigned for the call initiated by the user from the bearers in the multibearer network with overlapping coverage, and the identifier(s) of the at least one target base station is obtained, where the coverage of the target bearer of the one or multiple target base stations overlaps with the coverage of the bearer, on which the call is initiated, of the base station accessed by the user. Therefore, the total coverage of the target bearer of the target base station includes the coverage of the bearer, on which the call is initiated, of the base station accessed by the user, and the position of the user falls within the total coverage of the target bearers of the target base station. In this manner, in the scenario of the non co-sited network with overlapping coverage, the target bearer may be assigned for the call initiated by the user from the bearers in the multibearer network with overlapping coverage, and the user may successfully perform process relevant to the call on the target bearer of the target base station; and in the scenario of the co-sited network with overlapping coverage in which the coverage of the bearers of the base stations are inconsistent, the user may also successfully perform process relevant to the call on the target bearer of the target base station, thereby improving the success rate of the assignment.

BRIEF DESCRIPTION OF THE DRAWINGS

For a more complete understanding of the present invention, and the advantages thereof, reference is now made to the following descriptions taken in conjunction with the accompanying drawing, in which:

FIG. 6 is a schematic diagram of a situation in which a multicarrier co-sited network with overlapping coverage and a multicarrier non co-sited network with overlapping coverage coexists provided in an embodiment of the present invention;

FIG. 7 is a flowchart of a method for performing assignment for a call provided in Embodiment 1 of the present invention;

DETAILED DESCRIPTION OF ILLUSTRATIVE EMBODIMENTS

To make the objectives, technical solutions, and advantages of the present invention more comprehensible, the following further describes the embodiments of the present invention with reference to the accompanying drawings.

Wireless mobile cellular networking includes a multiband network with overlapping coverage and a multicarrier network with overlapping coverage. In the multiband network with overlapping coverage, any base station in the network may be used as a base station that a user accesses, any frequency band of the base station may be a frequency band on which the user initiates the call, and each of the other frequency bands in the networking may be a target frequency band. On the target frequency band, each base station whose coverage overlaps with the coverage of the frequency band accessed by the user of the base station accessed by the user may be a target base station. A system side obtains an identifier of the base station accessed by the user, an identifier of the target frequency band, and an identifier of the target base station, and stores the identifier of the base station accessed by the user, the identifier of the target frequency band, and the identifier of the target base station in relationships between identifier of the base station accessed by the user, identifiers of target frequency bands, and identifiers of target base stations. It should be noted that an identifier of each base station, an identifier of each frequency band and/or an identifier of each carrier in the network are stored in the system side, and therefore, the system side may directly obtain the identifier of the base station accessed by the user, the identifier of the target frequency band, and the identifier of the target base station.

Figure 1:
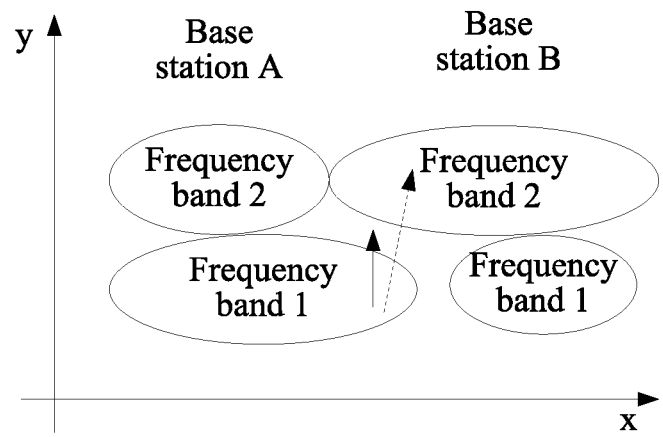
FIG. 1 is a schematic diagram of a multiband co-sited network with overlapping coverage provided in an embodiment of the present invention.

For example, in the multiband network with overlapping coverage shown in FIG. 1, an ellipse in FIG. 1 indicates the coverage of a frequency band of a base station, each ellipse is projected to a horizontal plane or a vertical plane, and if any two ellipses on the horizontal plane the vertical plane have an intersecting portion, it indicates that the ranges defined by the two ellipses overlaps. For a base station A in the networking and a frequency band 1 of the base station A, the base station A may be a base station that a user accesses, the frequency band 1 may be a frequency band on which the user initiates the call, and a frequency band 2 may be a target frequency band, where the coverage of the frequency band 1 of the base station A overlaps with the coverage of the frequency band 2 of the base station A, and the coverage of the frequency band 1 of the base station A overlaps with the coverage of the frequency band 2 of a base station B. Therefore, in the frequency band 2, both of the base stations A and B whose coverage overlaps with the coverage of the frequency band 1 of the base station A may be target base stations. The system side obtains an identifier IDA of the base station A, an identifier IDB of the base station B, and an identifier ID12 of the frequency band 2, and stores the identifier IDA of the base station A accessed by the user, the identifier ID12 of the target frequency band 2, the identifier IDA of the target base station A, and the identifier IDB of the target base station B in the relationships between the identifiers of the base stations accessed by the user, the identifiers of the target frequency bands, and the identifiers of the target base stations shown in Table 1, which can be seen in Row 2 of Table 1. The base station A may be a base station that the user accesses, the frequency band 2 may be a frequency band on which the user initiates the call, and the frequency band 1 may be a target frequency band, where the coverage of the frequency band 2 of the base station A overlaps with the coverage of the frequency band 1 of the base station A. Therefore, in the frequency band 1, the base station A whose coverage overlaps with the coverage of the frequency band 2 of the base station B may be a target base station. The system side obtains the identifier IDA of the base station A, the identifier IDB of the base station B, and an identifier ID11 of the frequency band 1, and stores the identifier IDA of the base station A accessed by the user, the identifier ID11 of the target frequency band 1, and the identifier IDA of the target base station A in the relationships between the identifiers of the base stations accessed by the user, the identifiers of the target frequency bands, and the identifiers of the target base stations shown in Table 1, which can be seen in Row 3 of Table 1. The system side establishes each of other relationships in Table 1 by using the same method.

TABLE 1

| Identifiers of base stations accessed by the user | Identifiers of target frequency bands | Identifiers of target base stations |
|---|---|---|
| IDA | ID12 | IDA and IDB |
| IDA | ID11 | IDA |
| IDB | ID12 | IDB |
| ... | ... | ... |

In any relationship in Table 1, an identifier of each target base station corresponds to the target base station, an identifier of each target frequency band corresponds to the target frequency band, an identifier of an base station accessed by the user corresponds to the base station accessed by the user, and the coverage of the target frequency band of each target base station includes the coverage of a certain frequency band of the base station accessed by the user. For example, for the relationships shown in Row 2 of Table 1, the identifiers IDA and IDB of the target base stations correspond to the target base stations A and B, respectively; the identifier ID12 of the target frequency band corresponds to the target frequency band 2, the identifier IDA of the base station accessed by the user corresponds to the base station A accessed by the user, and the total coverage of the target base stations A and B in the frequency band 2 includes the coverage of the base station A accessed by the user in the frequency band 1.

Figure 2:
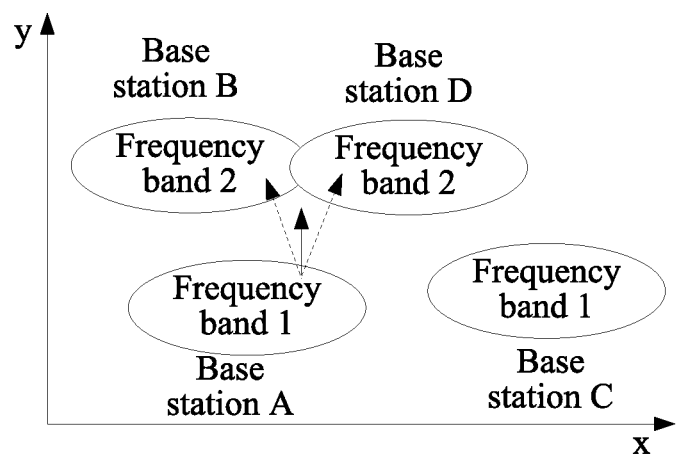
FIG. 2 is a schematic diagram of in a multiband non co-sited network with overlapping coverage provided in an embodiment of the present invention.
Figure 3:
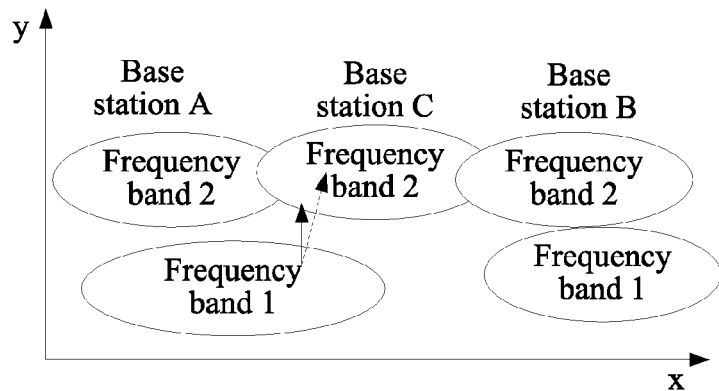
FIG. 3 is a schematic diagram of a situation in which a multiband co-sited network with overlapping coverage and a multiband non co-sited network with overlapping coverage coexists provided in an embodiment of the present invention.

A multiband network with overlapping coverage includes a multiband co-sited network with overlapping coverage, a multiband non co-sited network with overlapping coverage, and a situation in which a multiband co-sited network with overlapping coverage and a multiband non co-sited network with overlapping coverage coexists, as shown in FIG. 1, FIG. 2, and FIG. 3, respectively. For the multiband co-sited network with overlapping coverage shown in FIG. 1, the system side pre-establishes the relationships between the identifiers of the base stations accessed by the user, the identifiers of the target frequency bands, and the identifiers of the target base stations shown in Table 1. For the multiband non co-sited network with overlapping coverage shown in FIG. 2, the system side pre-establishes the relationships between the identifiers of the base stations accessed by the user, the identifiers of the target frequency bands, and the identifiers of the target base stations shown in Table 2. For the situation in which the multiband co-sited network with overlapping coverage and the multiband non co-sited network with overlapping coverage coexists shown in FIG. 3, the system side pre-establishes the relationships between the identifiers of the base stations accessed by the user, the identifiers of the target frequency bands, and the identifiers of the target base stations shown in Table 3.

TABLE 2

| Identifiers of base stations accessed by the user | Identifiers of target frequency bands | Identifiers of target base stations |
|---|---|---|
| IDA | ID12 | IDB and IDD |
| IDD | ID11 | IDA and IDC |
| ... | ... | ... |

TABLE 3

| Identifiers of base stations accessed by the user | Identifiers of target frequency bands | Identifiers of target base stations |
|---|---|---|
| IDA | ID12 | IDA and IDC |
| IDC | ID11 | IDA and IDB |
| ... | ... | ... |

Figure 4:
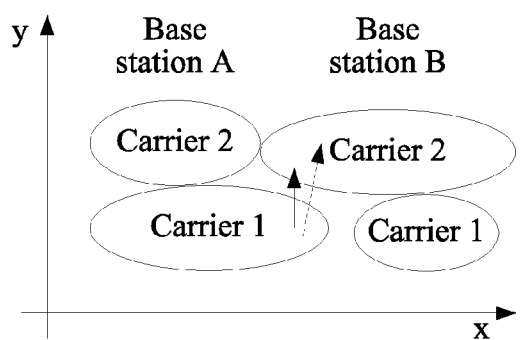
FIG. 4 is a schematic diagram of the multicarrier co-sited network with overlapping coverage provided in an embodiment of the present invention.
Figure 5:
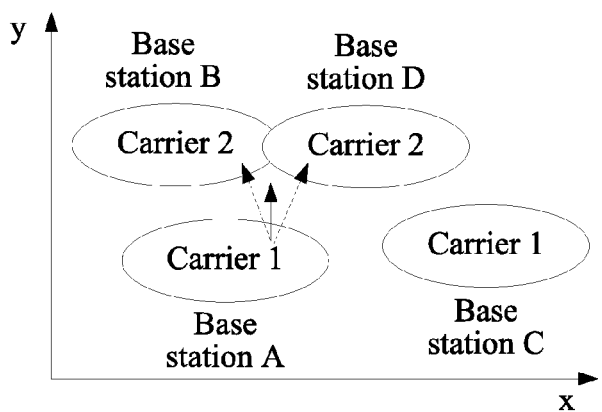
FIG. 5 is a schematic diagram of the multicarrier non co-sited network with overlapping coverage provided in an embodiment of the present invention.

A multicarrier network with overlapping coverage includes a multicarrier co-sited network with overlapping coverage, a multicarrier non co-sited network with overlapping coverage, and a situation in which a multicarrier co-sited network with overlapping coverage and a multicarrier non co-sited network with overlapping coverage coexists, as shown in FIG. 4, FIG. 5, and FIG. 6, respectively. The structure of the multiband network with overlapping coverage is the same as that of the multicarrier network with overlapping coverage, so the details are not described herein again. For the multicarrier co-sited network with overlapping coverage shown in FIG. 4, the system side pre-establishes the relationships between the identifiers of the base stations accessed by the user, the identifiers of the target carriers, and the identifiers of the target base stations shown in Table 4. For the multicarrier non co-sited network with overlapping coverage shown in FIG. 5, the system side pre-establishes the relationships between the identifiers of the base stations accessed by the user, the identifiers of the target carriers, and the identifiers of the target base stations shown in Table 5. For the situation in which a multicarrier co-sited network with overlapping coverage and a multicarrier non co-sited network with overlapping coverage coexists shown in FIG. 6, the system side pre-establishes the relationships between the identifiers of the base stations accessed by the user, the identifiers of the target carriers, and the identifiers of the target base stations shown in Table 6.

TABLE 4

| Identifiers of base stations accessed by the user | Identifiers of target carriers | Identifiers of target base stations |
|---|---|---|
| IDA | ID22 | IDA and IDB |
| IDA | ID21 | IDA |
| IDB | ID22 | IDB |
| ... | ... | ... |

TABLE 5

| Identifiers of base stations accessed by the user | Identifiers of target carriers | Identifiers of target base stations |
|---|---|---|
| IDA | ID22 | IDB and IDD |
| IDD | ID21 | IDA and IDC |
| ... | ... | ... |

TABLE 6

| Identifiers of base stations accessed by the user | Identifiers of target carriers | Identifiers of target base stations |
|---|---|---|
| IDA | ID22 | IDA and IDC |
| IDC | ID21 | IDA and IDB |
| ... | ... | ... |

Embodiment 1

An embodiment of the present invention provides a method for performing assignment for a call. This embodiment is applied in a multiband network with overlapping coverage or a multicarrier network with overlapping coverage. As shown in FIG. 7, the method includes:

Step 101: When a user initiates a call, a system side assigns a target bearer for the call from bearers in the multibearer network with overlapping coverage according to a load of each of the bearers or a service type of the call, and obtains an identifier of the target bearer, where the bearers include frequency bands or carriers.

Step 102: The system side determines one or multiple target base stations according to the identifier of the target bearer and an identifier of a base station through which the user initiates the call, where the coverage of the target bearer of the target base station overlaps with the coverage of a bearer, on which the call is initiated, of the base station accessed by the user, and obtains an identifier of the target base station.

Step 103: Send the obtained identifier of the target bearer and the obtained identifier of the target base station to the user.

After receiving the identifier of the target base station and the identifier of the target bearer, the user performs a process relevant to the call on the target bearer of the target base station according to the identifier of the target base station and the identifier of the target bearer.

In the embodiment of the present invention, when the user initiates a call, the system side assigns a target bearer for the call from bearers in the multibearer network with overlapping coverage according to a load of each of the bearers or a service type of the call, then determines a target base station, and obtains an identifier of the target base station, where the coverage of the target bearer of the target base station overlaps with the coverage of a bearer, on which the call is initiated, of a base station accessed by the user. Therefore, the total coverage of target bearers of the target base station includes the coverage of the bearer, on which the call is initiated, of the base station accessed by the user, and the position of the user falls within the coverage of the target bearer of the target base station. In this manner, in the scenario of the non co-sited network with overlapping coverage, a target bearer may be assigned for the call initiated by the user from bearers in the networking, and the user may successfully perform process relevant to the call on the target bearer of the target base station; and in the scenario of the co-sited network with overlapping coverage in which the coverage of the bearers of the base station is inconsistent, the user may also perform the process relevant to the call on the target bearer of the target base station, thereby improving the success rate of the assignment.

Embodiment 2

Figure 8:
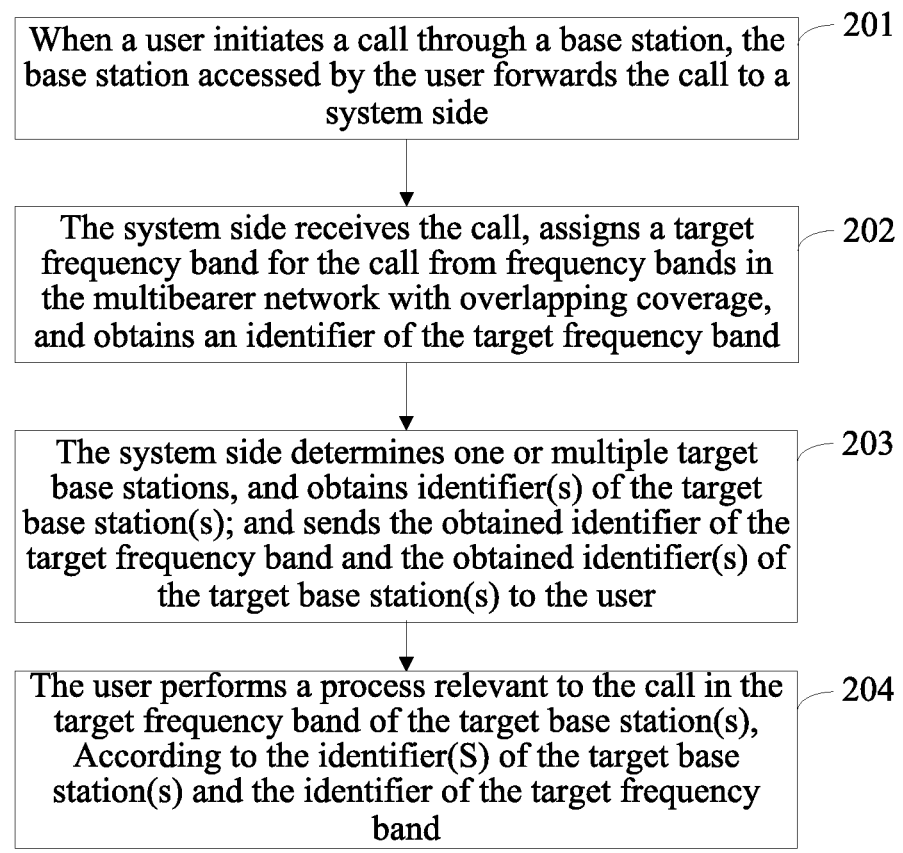
FIG. 8 is a flowchart of a method for assigning a bearer to a call provided in Embodiment 2 of the present invention.

An embodiment of the present invention provides a method for performing assignment for a call. The method is applied in a multiband network with overlapping coverage, where the multiband network with overlapping coverage includes a multiband co-sited network with overlapping coverage, a multiband non co-sited network with overlapping coverage, and coverage situation in which a co-sited multiband network with overlapping coverage and a non co-sited multiband network with overlapping coverage coexists. As shown in FIG. 8, the method includes:

Step 201: When a user initiates a call through a base station, the base station accessed by the user forwards the call to a system side.

A frequency band of each base station in the networking has certain coverage. For the coverage of a frequency band of any base station, if a position of the user falls within the coverage, the user may initiates a call in the frequency band of the base station.

Step 202: The system side receives the call, assigns a target frequency band for the call from frequency bands in the multiband network with overlapping coverage, and obtains an identifier of the target frequency band.

Specifically, after receiving the call, the system side may assign the target frequency band for the call and obtain the identifier of the target frequency band by using the following two methods, which include in a first method, the system side selects a frequency band with the smaller load from the frequency bands in the multiband network with overlapping coverage, uses the selected frequency band as a target frequency band, assigns a traffic channel in the target frequency band, and obtains an identifier of the target frequency band.

The system side knows load conditions of each frequency band in the multiband network with overlapping coverage.

In a second method, the system side selects, according to a service type of the call initiated by the user, a frequency band a service type of which is the same as the service type of the call initiated by the user from the frequency bands in the multiband network with overlapping coverage, uses the selected frequency band as a target frequency band, assigns a traffic channel in the target frequency band, and obtains an identifier of the target frequency band.

An attribute of the service type of a frequency band may be set, for example, the service type of the frequency band may be set to a data service or a voice service, the frequency band whose service type is the data service is used to perform a call of the data service, and the frequency band whose service type is the voice service is used to perform a call of the voice service.

Step 203: The system side determines one or multiple target base stations according to the identifier of the target bearer and an identifier of a base station through which the user initiates the call, where the coverage of the target frequency band of the target base station overlaps with the coverage of a frequency band, on which the call is initiated, of the base station accessed by the user, and obtains identifier(s) of the one or multiple target base stations; and sends the obtained identifier(s) of the target frequency band and the obtained identifier(s) of the one or multiple target base stations to the user.

Specifically, the system side may obtain the identifier(s) of the one or multiple target base stations by using the following two manners.

In a first manner, the system side searches relationships between identifier of the base station accessed by the user, identifier of the target frequency band, and identifiers of target base stations for the identifier(s) of the one or multiple target base stations according to the identifier of the base station accessed by the user for the call and the identifier of the assigned target frequency band, and sends the identifier of the assigned target frequency band and the identifier(s) of the one or multiple target base station to the user.

In a second manner, the system side searches, in the target frequency band, for at least one base station whose coverage overlaps with the coverage of the frequency band, on which the call is initiated, of the base station accessed by the user in the multiband network with overlapping coverage, uses the found base station(s) as the target base station(s), and obtains identifier(s) of the found target base station(s).

When the first manner is used to obtain the identifier of the target frequency band, because the relationships between the identifiers of the base stations accessed by the user, the identifiers of the target frequency bands, and the identifiers of the target base stations are directly searched for the identifier(s) of the target base station(s), the time required to obtain the identifier(s) of the target base station(s) is reduced, thereby improving the assignment efficiency.

If the user initiates the call in the frequency band, on which the call is initiated, of the base station accessed by the user, the system side automatically detects the base station accessed by the user and the frequency band on which the call is initiated. The total coverage of each target base station in the target frequency bands includes the coverage of the frequency band, on which the call is initiated, of the base station accessed by the user, and the position of the user falls within the coverage of the frequency band, on which the call is initiated, of the base station accessed by the user; therefore, the position of the user falls within the total coverage of the target frequency bands on each target base station.

Step 204: The user receives the identifier of the target frequency band and the identifier(s) of the target base station(s), and performs a process relevant to the call on the target frequency band of the target base station(s) according to the identifier(s) of the target base station(s) and the identifier of the target frequency band.

The number of target base stations determined by the system side is one or multiple. If the number of the target base stations is one, the user directly performs the process relevant to the call on the target frequency band of the target base station according to the identifier of the target base station and the identifier of the target frequency band. If the number of the target base stations is multiple, the user performs the process relevant to the call on the target frequency band of each target base station at the same time according to the identifier of the target base station and the identifier of the target frequency band.

The coverage of the frequency band, on which the call is initiated, of the base station accessed by the user overlaps with the coverage of the target frequency band of the target base station. Therefore, if the number of the target base stations is one, the position of the user falls within the coverage of the target frequency band of the target base station, so that the user can successfully perform the process relevant to the call on the target frequency band of the target base station. If the number of the target base stations is multiple, the position of the user falls within the total coverage of the target frequency bands on each target base station, and because the user performs the process relevant to the call on the target frequency band of each target base station at the same time, the user can successfully perform the process relevant to the call.

Furthermore, after step 202 is performed, the method further includes determine whether the assigned target frequency band is the frequency band on which the call is initiated. If yes, send a notification to the user; and if not, continue to perform step 203.

Accordingly, the user receives the notification, and performs the process relevant to the call on the frequency band, on which the call is initiated, of the base station accessed by the user.

For the multiband non co-sited network with overlapping coverage, the system side may assign a target frequency band for the call initiated by the user from frequency bands included in the networking. In addition, because the position of the user falls within the total coverage of the target frequency bands on each target base station, the user can successfully perform the process relevant to the call on the target frequency band of the target base station(s).

For the multiband co-sited network with overlapping coverage in which the coverage of the frequency bands of the base station accessed by the user are inconsistent, assume that the position of the user falls beyond the coverage of the target frequency band of the base station accessed by the user, and the coverage, obtained by the system side, of the target frequency band of the target base station(s) overlaps with the coverage of the frequency band, on which the call is initiated, of the base station accessed by the user, so that the position of the user falls within the total coverage of the target frequency bands on each target base station. Therefore, the user may successfully perform the process relevant to the call on the target frequency band of each target base station, thereby improving the success rate of the assignment.

The method provided in this embodiment may also be applied in a multicarrier network with overlapping coverage, where the multicarrier network with overlapping coverage includes a multicarrier co-sited network with overlapping coverage, a multicarrier non co-sited network with overlapping coverage, and the situation in which a multicarrier co-sited network with overlapping coverage and a multicarrier non co-sited network with overlapping coverage coexists. After the user initiates a call, the system side assigns a target carrier from carriers included in the multicarrier network with overlapping coverage according to a load of each carrier or a service type of the call, obtains an identifier of the target carrier, searches relationships between identifiers of base stations accessed by the user, identifiers of target carriers, and identifiers of target base stations for identifier(s) of corresponding target base station(s) according to an identifier of a base station accessed by the user and the identifier of the target carrier, and sends the identifier(s) of the target base station(s) and the identifier of the target carrier to the user. The user performs process relevant to the call on the target carrier of the target base station(s) according to the identifier(s) of the target base station(s) and the identifier of the target carrier. Because the coverage of the target carrier of the target base station(s) overlaps with the coverage of the carrier, on which the call is initiated, of the base station accessed by the user, the position of the user falls within the coverage of the target frequency band of the target base station(s). Therefore, in either the multicarrier non co-sited network with overlapping coverage or the multicarrier co-sited network with overlapping coverage, the user may successfully perform the process relevant to the call on the target carrier of the target base station(s), thereby improving the success rate of the assignment.

In the embodiment of the present invention, when a user initiates a call, the system side assigns a target frequency band from frequency bands included in the multiband network with overlapping coverage, obtains an identifier of the target frequency band, determines target base station(s), and obtains identifier(s) of the target base station(s). The coverage of the target frequency band of the target base station(s) is superposed with the coverage of a frequency band, on which the call is initiated, of a base station accessed by the user, and the user performs process relevant to the call on the target frequency band of the target base station(s). The system side is capable of assigning the target frequency band for the call from the frequency bands included in the multiband network with overlapping coverage, and the position of the user falls within the total coverage of the target frequency bands on each target base station. Therefore, for the scenario of the multiband non co-sited network with overlapping coverage, the system side may also assign the target frequency band for the call, and for the multiband co-sited network with overlapping coverage in which the coverage of the frequency bands of the base station is inconsistent, the user may successfully perform the process relevant to the call on the target frequency band of the target base station(s), thereby improving the success rate of the assignment.

Embodiment 3

Figure 9:
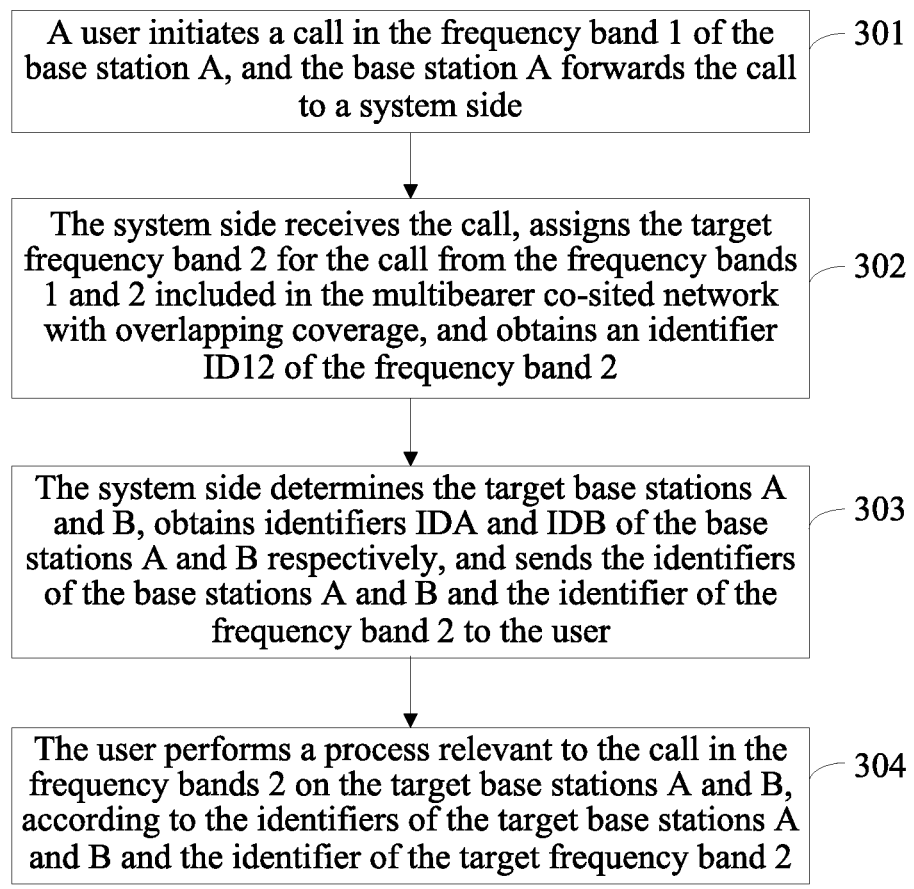
FIG. 9 is a flowchart of a method for assigning a bearer to a call provided in Embodiment 3 of the present invention.

An embodiment of the present invention provides a method for performing assignment for a call. This embodiment is applied in the multicarrier co-sited network with overlapping coverage shown in FIG. 1. The networking includes a base station A and a base station B. The base station A has a frequency band 1 and a frequency band 2, and the coverage of the frequency band 1 is inconsistent with the coverage of the frequency band 2. The base station B has a frequency band 1 and a frequency band 2, and the coverage of the frequency band 1 is inconsistent with the coverage of the frequency band 2. A user initiates a call in the frequency band 1 of the base station A, as shown by a solid arrow in FIG. 1, and the position of the user falls beyond the coverage of the frequency band 2. As shown in FIG. 9, the method includes:

Step 301: The user initiates a call in the frequency band 1 of the base station A, and the base station A forwards the call to a system side.

Step 302: The system side receives the call, assigns a target frequency band for the call from the frequency bands 1 and 2 included in the multiband co-sited network with overlapping coverage, and obtains an identifier ID12 of the frequency band 2, assuming that the assigned target frequency band is the frequency band 2.

Specifically, after receiving the call, the system side may assign the target frequency band for the call and obtain the identifier of the target frequency band by using the following two methods, which include in a first method, if it is assumed that a load of the frequency band 2 is smaller than that of the frequency band 1, the system side selects the frequency band 2 with the smaller load, uses the selected frequency band 2 as a target frequency band, assigns a traffic channel in the frequency band 2, and obtains the identifier ID12 of the frequency band 2.

In a second method, if it is assumed that a service type of the call is a voice service, a service type of the frequency band 2 is also a voice service and a service type of the frequency band 1 is a data service, the system side selects, the corresponding frequency band 2 according to the service type (voice service) of the call, uses the selected frequency band 2 as a target frequency band, assigns a traffic channel in the frequency band 2, and obtains an identifier ID12 of the frequency band 2.

Step 303: The system side determines the target base stations A and B where the coverage of the frequency bands 2 of the target base stations A and B each overlaps with the coverage of the frequency band 1 of the base station A, obtains an identifier IDA of the base station A and an identifier IDB of the base station B, and sends the obtained identifier IDA of the target base station A, the obtained identifier IDB of the target base station B, and the obtained identifier ID12 of the frequency band 2 to the user.

Specifically, the system side obtains the identifiers of the target base stations A and B by using the following two manners.

In a first manner, the system side searches the relationships between the identifiers of the base stations accessed by the user, the identifiers of the target frequency bands, and the identifiers of the target base stations shown in Table 1 for the identifier IDA of the target base station A and the identifier IDB of the target base station B according to the identifier IDA of the base station A through which the call is initiated and the identifier ID12 of the target frequency band 2, and sends the identifier IDA of the target base station A, the identifier IDB of the target base station B, and the identifier ID of the frequency band 2 to the user.

In a second manner, the system side searches, in the target frequency band 2, for the base stations A and B whose coverage overlaps with the coverage of the frequency band 1 of the base station A in the multiband co-sited network with overlapping coverage, uses the base stations A and B as target base stations, obtains an identifier IDA of the target base station A and an identifier IDB of the target base station B, and sends the identifier IDA of the target base station A, the identifier IDB of the target base station B, and the identifier ID12 of the frequency band 2 to the user.

Step 304: The user receives the identifier IDA of the target base station A, the identifier IDB of the target base station B, and the identifier ID12 of the target frequency band 2, and performs process relevant to the call in traffic channels assigned to the target frequency bands 2 of the target base stations A and B at the same time according to the identifier IDA of the target base station A, the identifier IDB of the target base station B, and the identifier ID12 of the target frequency band 2.

When the user performs the process relevant to the call on the frequency bands 2 of the target base stations A and B at the same time, because the position of the user falls beyond the coverage of the frequency band 2 of the base station A but falls within the coverage of the frequency band 2 of the base station B, the user fails to perform the process relevant to the call on the frequency band 2 of the base station A but successfully performs the process relevant to the call on the frequency band 2 of the base station B, as shown by a dotted arrow in FIG. 1.

Furthermore, in step 302, if the target frequency band assigned by the system side is the frequency band 1, the system side directly sends a notification to the user. Accordingly, the user receives the notification and performs the process relevant to the call on the frequency band 1 of the base station A.

This embodiment may also be applied in the multicarrier co-sited network with overlapping coverage shown in FIG. 4. When the user initiates a call in a carrier 1 of the base station A, the base station A forwards the call to the system side, and the system side assigns a target carrier for the call. If it is assumed that the assigned target carrier is a carrier 2, the system side obtains an identifier ID22 of the carrier 2, obtains the identifier IDA of the target base station A and the identifier IDB of the target base station B from the relationships between the identifiers of the base stations accessed by the user, the identifiers of the target carriers, and the identifiers of the target base stations shown in Table 4 according to the identifier IDA of the base station A and the identifier ID22 of the carrier 2, and sends the identifier ID22 of the target carrier 2, the identifier IDA of the target base station A, and the identifier IDB of the target base station B to the user. The user performs the process relevant to the call on the target carriers 2 of the target base stations A and B according to the identifier IDA of the target base station A, the identifier IDB of the target base station B, and the identifier ID22 of the target carrier 2. Because the coverage of the carrier 2 of the target base station B includes the position of the user, the user may successfully perform the process relevant to the call on the carrier 2 of the target base station B, thereby improving the success rate of the assignment.

In the embodiment of the present invention, for the multiband co-sited network with overlapping coverage, because the coverage of the frequency band 2 of the target base station B includes the position of the user, the user may successfully perform the process relevant to the call on the frequency band 2 of the target base station B, thereby improving the success rate of the assignment.

Embodiment 4

Figure 10:
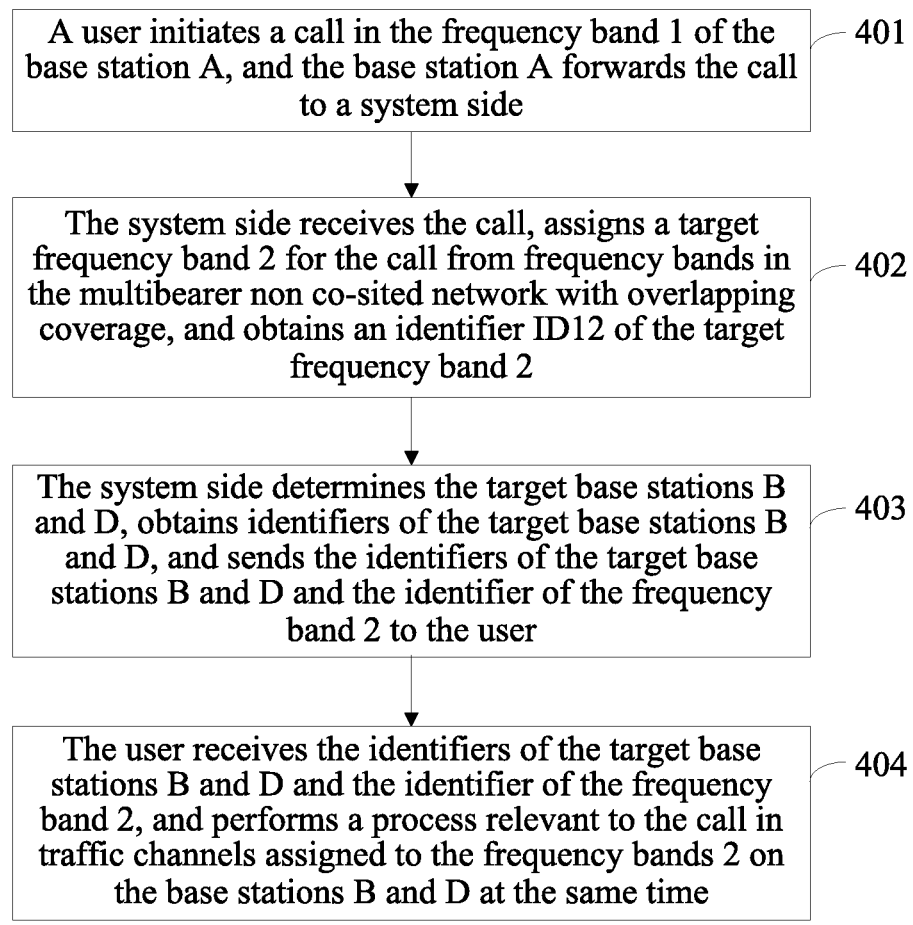
FIG. 10 is a flowchart of a method for assigning a bearer to a call provided in Embodiment 4 of the present invention.

An embodiment of the present invention provides a method for performing assignment for a call. This embodiment is applied in the multiband non co-sited network with overlapping coverage shown in FIG. 2. Base stations A, B, C, and D are included in the networking, where the base stations A and C each have a frequency band 1, and the base stations B and D each have a frequency band 2. It is assumed that a user initiates a call in the frequency band 1 of the base station A, as shown by a solid arrow in FIG. 2. As shown in FIG. 10, the call is assigned by using the method provided in this embodiment. The method includes:

Step 401: The user initiates a call in the frequency band 1 of the base station A, and the base station A forwards the call to a system side.

Step 402: The system side receives the call, assigns a target frequency band for the call from the frequency bands in the multiband non co-sited network with overlapping coverage, and obtains an identifier ID12 of the target frequency band 2 by assuming that the assigned target frequency band is the frequency band 2.

The frequency bands 1 and 2 are included in the multiband non co-sited network with overlapping coverage. In addition, after the system side receives the call, the specific process of assigning the frequency band 2 for the call is the same as that in step 302 in Embodiment 3, and the details are not described herein again. The system side assigns a traffic channel for the call in the frequency band 2.

Step 403: The system side determines the target base stations B and D where the coverage of the frequency bands 2 of the target base stations B and D each overlaps with the coverage of the frequency band 1 of the base station A accessed by the user, obtains an identifier IDB of the target base station B and an identifier IDD of the target base station D, and sends the identifier IDB of the target base station B, the identifier IDD of the target base station D, and the identifier ID12 of the frequency band 2 to the user.

Specifically, the system side obtains the identifiers of the target base stations B and D by using the following two manners.

In a first manner, the system side searches the relationships between the identifiers of the base stations accessed by the user, the identifiers of the target frequency bands, and the identifiers of the target base stations shown in Table 2 to obtain the identifier IDB of the target base station B and the identifier IDD of the target base station D according to the identifier of the base station A accessed by the user and the identifier of the target frequency band 2, and sends the identifier IDB of the target base station B, the identifier IDD of the target base station D, and the identifier ID12 of the frequency band 2 to the user.

In a second manner, the system side searches, in the target frequency band 2, for the base stations B and D whose coverage overlaps with the coverage of the frequency band 1 of the base station A in the multiband co-sited network with overlapping coverage, uses the base stations B and D as target base stations, obtains an identifier IDB of the target base station B and an identifier IDD of the target base station D, and sends the identifier IDB of the target base station B, the identifier IDD of the target base station D, and the identifier ID12 of the frequency band 2 to the user.

Step 404: The user receives the identifier IDB of the target base station B, the identifier IDD of the target base station D, and the identifier ID12 of the frequency band 2, and performs process relevant to the call in traffic channels assigned to the frequency bands 2 of the base stations B and D at the same time according to the identifier IDB of the target base station B, the identifier IDD of the target base station D, and the identifier ID12 of the frequency band 2.

In the networking shown in FIG. 2, the position of the user falls within the coverage of the frequency band 2 of the base station B and falls within the coverage of the frequency band 2 of the base station D, and the user may successfully perform the process relevant to the call of the base stations B and D, as shown by a dotted arrow in FIG. 2.

Furthermore, in step 402, if the target frequency band assigned by the system side is the frequency band 1, the system side directly sends a notification to the user. Accordingly, the user receives the notification and performs the process relevant to the call on the frequency band 1 of the base station A.

This embodiment may also be applied in the multicarrier non co-sited network with overlapping coverage shown in FIG. 5. The user initiates a call on a carrier 1 of the base station A, and the base station A forwards information of the call to the system side. The system side receives information of the call, assigns a target carrier 2 for the call from all carriers in the multicarrier non co-sited network with overlapping coverage, obtains an identifier ID22 of the carrier 2, searches the relationships between the identifiers of the base stations accessed by the user, the identifiers of the target carriers, and the identifiers of the target base stations shown in Table 4 to obtain an identifier IDB of the target base station B and an identifier IDD of the target base station D according to an identifier IDA of the base station A and the identifier ID22 of the carrier 2, and sends the identifier IDB of the target base station B, the identifier IDD of the target base station D, and the identifier ID22 of the carrier 2 to the user. The user receives the identifier IDB of the target base station B, the identifier IDD of the target base station D, and the identifier ID22 of the carrier 2, and performs the process relevant to the call on the carriers 2 of the base stations B and D at the same time according to the identifier IDB of the target base station B, the identifier IDD of the target base station D, and the identifier ID22 of the carrier 2. Therefore, the system side is capable of assigning a target carrier for the call from all the carriers in the networking, and the user may successfully perform the process relevant to the call on the carriers 2 of the target base stations B and D, thereby improving the success rate of the assignment.

In the non co-sited network with overlapping coverage, the call is assigned to the optimal frequency band or carrier in the networking, so as to improve the utilization rate of resources in the networking and performance of the network.

In the embodiment of the present invention, for the multiband non co-sited network with overlapping coverage, the system side is capable of assigning a target frequency band for the call from all the frequency bands in the networking. In addition, the coverage of the frequency bands 2 of the target base stations B and D each includes the position of the user. Therefore, the user may successfully perform the process relevant to the call on the frequency bands 2 of the target base stations B and D, thereby improving the success rate of the assignment.

Embodiment 5

Figure 11:
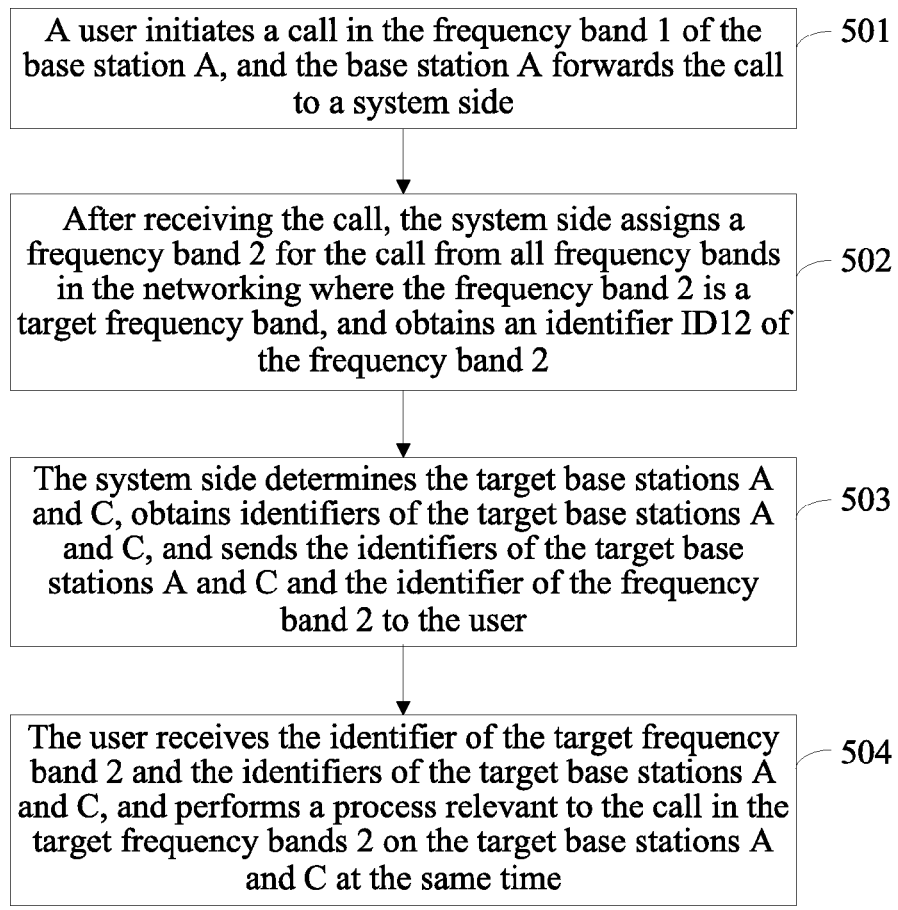
FIG. 11 is a flowchart of a method for assigning a bearer to a call provided in Embodiment 5 of the present invention.

An embodiment of the present invention provides a method for performing assignment for a call. This embodiment is applied in a scenario of a situation in which a co-sited multiband network with overlapping coverage and a non co-sited multiband network with overlapping coverage coexists shown in FIG. 3. Base stations A, B, and C are included in the networking, where the base station A has frequency bands 1 and 2, the base station B has the frequency bands 1 and 2, and the base station C has the frequency band 2. It is assumed that the user initiates a call in the frequency band 1 of the base station A, as shown by a solid arrow in FIG. 3. As shown in FIG. 11, the call is assigned by using the method provided in this embodiment. The method includes:

Step 501: The user initiates a call in the frequency band 1 of the base station A, and the base station A forwards the call to a system side.

The base station A is an base station accessed by the user, and the frequency band 1 is an frequency band accessed by the user.

Step 502: After receiving the call, the system side assigns a frequency band 2 for the call from all frequency bands in the networking where the frequency band 2 is a target frequency band, and obtains an identifier ID12 of the frequency band 2.

After the system side receives information of the call, the specific process of assigning the frequency band 2 for the call is the same as that in step 302 in Embodiment 3, and the details are not described herein again. The system side assigns a traffic channel for the call in the frequency band 2.

Step 503: The system side determines the target base stations A and C where the coverage of the frequency bands 2 of the target base stations A and C each overlaps with the coverage of the frequency band 1 of the base station A, obtains an identifier IDA of the target base station A and an identifier IDC of the target base station C, and sends the identifier IDA of the target base station A, the identifier IDC of the target base station C, and the identifier ID12 of the frequency band 2 to the user.

Specifically, the system side obtains the identifiers of the target base stations A and C by using the following two manners.

In a first manner, the system side searches the relationships between the identifiers of the base stations accessed by the user, the identifiers of the target frequency bands, and the identifiers of the target base stations shown in Table 5 to obtain the identifier IDA of the target base station A and the identifier IDC of the target base station C according to the identifier IDA of the base station A accessed by the user and the identifier ID12 of the target frequency band 2, and sends the identifier ID12 of the target frequency band 2, the identifier IDA of the target base station A, and the identifier IDC of the target base station C to the user.

In a second manner, the system side searches, in the target frequency band 2, the base stations A and C whose coverage overlaps with the coverage of the frequency band 1 of the base station A in the multiband co-sited network with overlapping coverage, uses the base stations A and C as target base stations, obtains an identifier IDA of the target base station A and an identifier IDC of the target base station C, and sends the identifier IDA of the target base station A, the identifier IDC of the target base station C, and the identifier ID12 of the frequency band 2 to the user.

Step 504: The user receives the identifier ID12 of the target frequency band 2, the identifier IDA of the target base station A, and the identifier IDC of the target base station C, and performs process relevant to the call on the target frequency bands 2 of the target base stations A and C at the same time according to the identifier ID12 of the target frequency band 2, the identifier IDA of the target base station A, and the identifier IDC of the target base station C.

Furthermore, in step 502, if the target frequency band assigned by the system side is the frequency band 1, the system side directly sends a notification to the user. Accordingly, the user receives the notification and performs the process relevant to the call on the frequency band 1 of the base station A.

This embodiment may also be applied in the scenario of a situation in which a multicarrier co-sited network with overlapping coverage and a multicarrier non co-sited network with overlapping coverage coexists shown in FIG. 6. When the user initiates a call in a carrier 1 of the base station A, the base station A forwards the call to the system side. The system side assigns a carrier 2 for the call, obtains an identifier ID22 of the carrier 2, obtains an identifier IDA of the target base station A and an identifier IDC of the target base station C from the relationships between the identifiers of the base stations accessed by the user, the identifiers of the target carriers, and the identifiers of the target base stations shown in Table 6, and sends the identifier IDA of the target base station A, the identifier IDC of the target base station C, and the identifier ID22 of the frequency band 2 to the user. The user performs the process relevant to the call in the traffic channels assigned to the frequency bands 2 of the base stations A and C according to the identifier IDA of the target base station A, the identifier IDC of the target base station C, and the identifier ID22 of the frequency band 2.

In the embodiment of the present invention, for the scenario of the situation in which a co-sited multiband network with overlapping coverage and a non co-sited multiband network with overlapping coverage coexists, the system side is capable of assigning a target frequency band for the call from all the frequency bands in the networking. In addition, the total coverage of the frequency bands 2 of the target base stations A and C includes the position of the user. Therefore, the user may successfully perform the process relevant to the call on the frequency bands 2 of the target base stations A and C, thereby improving the success rate of the assignment.

Embodiment 6

Figure 12:
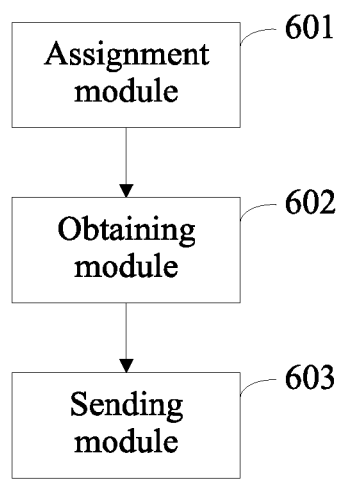
FIG. 12 is a schematic diagram of a device for assigning a bearer to a call provided in Embodiment 6 of the present invention.

As shown in FIG. 12, an embodiment of the present invention provides a device for performing assignment for a call, including an assignment module 601, configured to, when a user initiates a call, assign a target bearer for the call from bearers in a multibearer network with overlapping coverage according to a load of each of the bearers or a service type of the call, and obtain an identifier of the target bearer, where the bearers include frequency bands or carriers, an obtaining module 602, configured to determine one or multiple target base stations according to the identifier of the target bearer and an identifier of a base station through which the user initiates the call, where the coverage of the target bearer of the target base station(s) overlaps with the coverage of a bearer of the base station through which the user initiates the call, and obtain identifier(s) of the target base station(s), and a sending module 603, configured to send the obtained identifier of the target bearer and the obtained identifier(s) of the target base station(s) to the user.

The obtaining module 602 is specifically configured to search preset relationships between identifiers of base stations accessed by the user, identifiers of target bearers, and identifiers of target base stations for identifier(s) of corresponding target base station(s) according to the identifier of the target bearer and the identifier of the base station through which the user initiates the call, where the coverage of the bearer through which the user initiates the call of the base station accessed by the user overlaps with the coverage of the target bearer of the target base station(s) corresponding to the base station accessed by the user in the relationships.

The obtaining module 602 is specifically configured to search, in the assigned target bearer, target base station(s) whose coverage overlaps with the coverage of the bearer, on which the call is initiated, of the base station accessed by the user, and obtain an identifier of the found target base station(s).

Furthermore, the device further includes a notification module.

The notification module is configured to skip performing actions of determining the target base station(s) and sending the identifier(s) of the target base station(s) and the identifier of the target bearer if the assigned target bearer is the bearer through which the user initiates the call, and send a notification to the user, where the notification is used to instruct the user to perform process relevant to the call on the bearer, on which the call is initiated, of the base station accessed by the user.

In the embodiment of the present invention, the system side assigns a target bearer from the bearers included in the multibearer network with overlapping coverage, and obtains identifier(s) of arget base station(s), where the coverage of the target bearer of the target base station(s) overlaps with the coverage of a bearer, on which the call is initiated, of a base station accessed by the user, and the user performs process relevant to the call on the target bearer of the target base station(s). The system side is capable of assigning the target bearer for the call from the bearers included in the multibearer network with overlapping coverage, and the position of the user falls within the total coverage of the target bearers on each target base station. Therefore, for the scenario of the multibearer non co-sited network with overlapping coverage, the system side may also assign a target bearer for the call, and for the scenario of the multibearer co-sited network with overlapping coverage in which the coverage of the bearers of the base station is inconsistent, the user may successfully perform the process relevant to the call on the target bearer of the target base station(s), thereby improving the success rate of the assignment.

Embodiment 7

Figure 13:
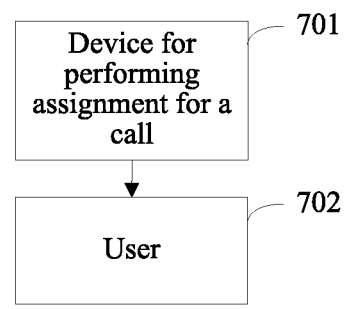
FIG. 13 is a schematic diagram of a system for assigning a bearer to a call provided in Embodiment 7 of the present invention.

As shown in FIG. 13, an embodiment of the present invention provides a system for performing assignment for a call, including a device 701 for performing assignment for a call and a user 702.

The device 701 for performing assignment for a call is configured to, when the user 702 initiates a call, assign a target bearer for the call from bearers in a multibearer network with overlapping coverage according to a load of each of the bearers or a service type of the call, and obtain an identifier of the target bearer, where the bearers include frequency bands or carriers; determine one or multiple target base stations according to the identifier of the target bearer and the identifier of the base station accessed by the user 702 to initiate the call, where the coverage of the target bearer of the target base station(s) overlaps with the coverage of the bearer, on which the call is initiated, of the base station accessed by the user 702 to initiate the call, and obtain an identifier of the target base station(s); and send the identifier of the target bearer and the identifier of the target base station(s) to the user 702.

In the embodiment of the present invention, the target bearer is assigned for the call from the bearers in the multibearer network with overlapping coverage and the identifier of the target base station(s) is obtained, where the coverage of the target bearer of the target base station(s) overlaps with the coverage of the bearer, on which the call is initiated, of the base station accessed by the user to initiate the call. Therefore, the total coverage of the target bearers of the target base station(s) includes the coverage of the bearer, on which the call is initiated, of the base station accessed by the user, and the position of the user falls within the total coverage of the target bearers of the target base station(s). In this manner, in the scenario of the non co-sited network with overlapping coverage, the target bearer may be assigned for the call from the bearers in the multibearer network with overlapping coverage, and the user may successfully perform the process relevant to the call on the target bearer of the target base station(s); and in the scenario of the co-sited network with overlapping coverage in which the coverage of the bearers of the base station is inconsistent, the user may also successfully perform the process relevant to the call on the target bearer of the target base station(s), thereby improving the success rate of the assignment.

All or part of the content in the technical solutions provided in the foregoing embodiments may be implemented by software programs, and the software programs are stored in readable storage media such as a computer hard disk, an optical disk, or a floppy disk.

The foregoing descriptions are merely exemplary embodiments of the present invention and are not intended to limit the present invention. Any modification, equivalent replacement, or improvement made within the spirit and principle of the present invention shall fall within the protection scope of the present invention.

What is claimed is:

1. A method for performing assignment for a call in a multibearer network, the method comprising:

when a user terminal accesses to a base station and initiates a call on a bearer of the base station, assigning, by a system side, a target bearer for the call from bearers in the multibearer network according to load of each of the bearers or service type of the call, and obtaining an identifier of the target bearer, wherein any one of the bearers comprises frequency band or carrier;

determining, by the system side, at least one target base station according to the identifier of the target bearer and an identifier of the base station accessed by the user terminal, wherein the coverage of the target bearer of the at least one target base station overlaps with the coverage of the bearer, on which the call is initiated by the user terminal, and obtaining identifier of the at least one target base station; and sending, by the system side, the identifier of the target bearer and the identifier of the at least one target base station to the user terminal.

2. The method according to claim 1, wherein the determining, by the system side, at least one target base station according to the identifier of the target bearer and the identifier of the base station accessed by the user terminal, and obtaining the identifier of the target base station comprises:

obtaining, by the system side, identifier of the at least one target bearer by searching preset relationships between identifier of base station accessed by the user terminal, identifier of target bearer, and identifier of at least one target base station according to the identifier of the target bearer and the identifier of the base station accessed by the user terminal.

3. The method according to claim 2, wherein the relationships comprises indication about whether the coverage of a bearer, on which the call is initiated by the user terminal overlaps with the coverage of the target bearer of the at least one target base station corresponding to the base station accessed by the user terminal.

4. The method according to claim 1, wherein the obtaining, by the system side, identifier of the at least one target base station comprises:
  searching, by the system side, according to the target bearer, for at least one target base station whose coverage overlaps with the coverage of the bearer, on which the call is initiated, and
  obtaining an identifier of the at least one target base station.

5. The method according to claim 1, wherein after the sending, by the system side, the identifier of the target bearer and the identifier of the at least one target base station to the user terminal, the method further comprises:
  if the number of the at least one target base station is one, performing, by the user, a process relevant to the call on the target bearer of the target base station according to the identifier of the target bearer and the identifier of the target base station; and
  if the number of the at least one target base station is multiple, performing, by the user, a process relevant to the call on the target bearer of each target base station according to the identifier of the target bearer and the identifier of the target base station.

6. A device for performing assignment for a call in a multibearer network, the device comprising:
  an assignment module, configured to, when a user terminal accesses to a base station and initiates a call on a bearer of the base station, assign a target bearer for the call from bearers in the multibearer network according to a load of each of the bearers or service type of the call, and obtain identifier of the at least one target bearer, wherein any one of the bearers comprises frequency band or carrier;
  an obtaining module, configured to determine at least one target base station according to the identifier of the target bearer and an identifier of the base station accessed by the user terminal, wherein the coverage of the target bearer of the at least one target base station overlaps with the coverage of the bearer, on which the call is initiated by the user terminal, and obtain an identifier of the target base station; and
  a sending module, configured to send the identifier of the target bearer and the identifier of the at least one target base station to the user terminal.

7. The device according to claim 6, wherein
  the obtaining module is specifically configured to obtain identifier of the at least one target base station by searching preset relationships between identifiers of base stations accessed by the user, identifiers of at least one target bearer, and identifier of the at least one target base station according to the identifier of the target bearer and the identifier of the base station accessed by the user terminal.

8. The device according to claim 7, wherein the relationships comprises indication about whether the coverage of a bearer, on which the call is initiated overlaps with the coverage of the target bearer of the at least one target base station corresponding to the base station accessed by the user terminal.

9. The device according to claim 6, wherein the obtaining module is specifically configured to search, according to the target bearer, for at least one target base station whose coverage overlaps with the coverage of the bearer, on which the call is initiated, and obtain the identifier of the at least one target base station.

10. A computer program product comprising a computer readable storage medium storing program code thereon for use by a communication node for performing assignment for a call, the program code comprising instructions for executing a method that comprises:
  when a user terminal accesses to a base station and initiates a call on a bearer of the base station, assigning a target bearer for the call from bearers in the multibearer network according to load of each of the bearers or service type of the call, and obtaining an identifier of the target bearer, wherein any one of the bearers comprises frequency band or carrier;
  determining at least one target base station according to the identifier of the target bearer and an identifier of the base station accessed by the user terminal, wherein the coverage of the target bearer of the at least one target base station overlaps with the coverage of the bearer, on which the call is initiated by the user terminal, and obtaining identifier of the at least one target base station; and
  sending the identifier of the target bearer and the identifier of the at least one target base station to the user terminal.

11. The computer program product according to claim 10, wherein the determining at least one target base station according to the identifier of the target bearer and the identifier of the base station accessed by the user terminal, and obtaining the identifier of the target base station comprises:
  obtaining identifier of the at least one target bearer by searching preset relationships between identifier of base station accessed by the user terminal, identifier of target bearer, and identifier of at least one target base station according to the identifier of the target bearer and the identifier of the base station accessed by the user terminal.

12. The computer program product according to claim 10, wherein the obtaining identifier of the at least one target base station comprises:
  searching according to the target bearer, for at least one target base station whose coverage overlaps with the coverage of the bearer, on which the call is initiated by the user terminal, and
  obtaining identifier of the at least one target base station.

* * * * *